(12) United States Patent
Hatta et al.

(10) Patent No.: US 6,519,381 B2
(45) Date of Patent: Feb. 11, 2003

(54) OPTICAL SWITCH AND METHOD OF PRODUCING THE SAME

(75) Inventors: Tatsuo Hatta, Hyogo (JP); Atsushi Sugitatsu, Hyogo (JP); Takeshi Saito, Hyogo (JP); Aritomo Uemura, Hyogo (JP); Jun Fujita, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 42 days.

(21) Appl. No.: 09/836,179

(22) Filed: Apr. 18, 2001

(65) Prior Publication Data

US 2002/0067878 A1 Jun. 6, 2002

(30) Foreign Application Priority Data

Dec. 6, 2000 (JP) .......................................... 2000-371351

(51) Int. Cl.[7] ............................... G02B 6/26; G02B 6/42
(52) U.S. Cl. ......................... 385/16; 385/13; 385/140; 250/227.22
(58) Field of Search .......................... 385/13–19, 140; 250/227.21, 227.22, 227.15, 239

(56) References Cited

U.S. PATENT DOCUMENTS 4,315,147 A * 2/1982 Harmer ................. 250/227.22
5,119,448 A * 6/1992 Schaefer et al. ............... 385/4
5,333,217 A * 7/1994 Kossat ...................... 385/13 X

FOREIGN PATENT DOCUMENTS

JP 2-136805 5/1990
JP 11-337850 12/1999

OTHER PUBLICATIONS

"Compact optical cross–connect switch based on total internal reflection in a fluid–containing planar lightwave circuit", J.E. Fouquet, Optical Fiber Communication Conference 2000, Mar. 7, 2000.

* cited by examiner

Primary Examiner—Lynn D. Feild
Assistant Examiner—Son V. Nguyen
(74) Attorney, Agent, or Firm—McDermott, Will & Emery

(57) ABSTRACT

An optical switch includes a polymer optical waveguide that is a plate material basically made of polymer and a drive element. The plate material has optical waveguides that extend linearly within the plate material and a cut provided such that it traverses the optical waveguides. The drive element selects a path of light by reducing and increasing a gap of the cut.

14 Claims, 7 Drawing Sheets

FIG. 3A
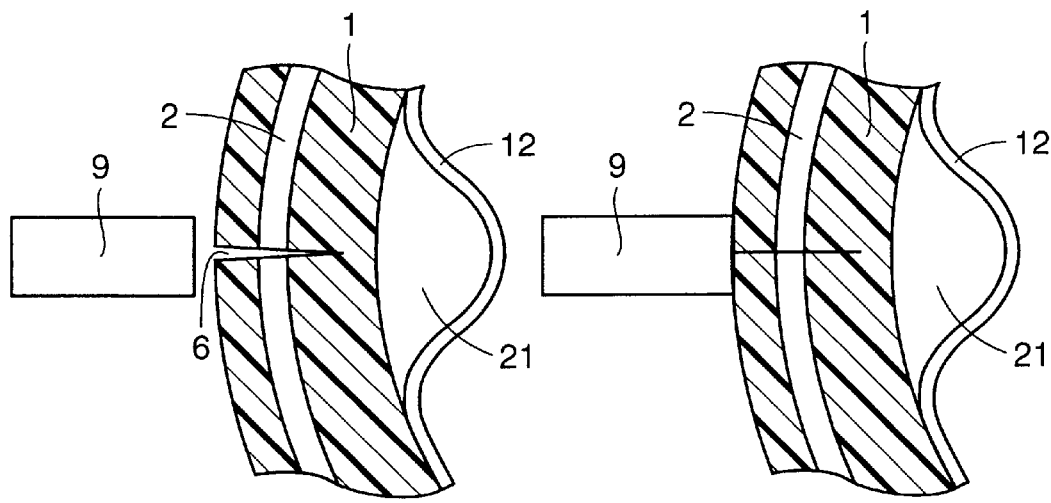
FIG. 3B
FIG. 4A
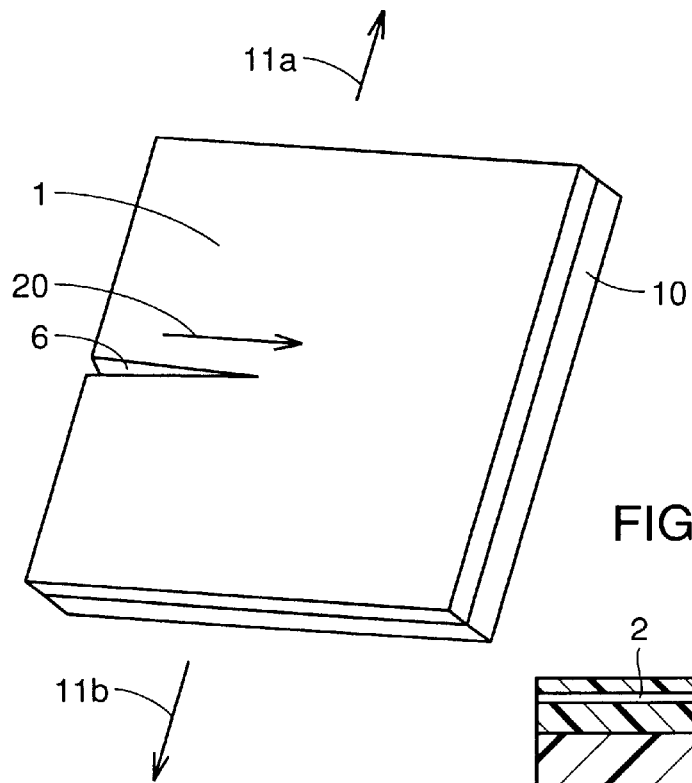
FIG. 4B

OPTICAL SWITCH AND METHOD OF PRODUCING THE SAME

BACKGROUND OF THE INVENTION

1. Field of the Invention

The present invention relates to an optical switch used for switching of an optical path in an optical communication equipment.

2. Description of the Background Art

A conventional optical switch 100 will be described with reference to FIG. 13. This optical switch 100 is one shown in TuM1 (J. E. Fouquet, "Compact optical cross-connect switch based on total internal reflection in a fluid-containing planar lightwave circuit") at OFC 2000 (Optical Fiber communication Conference, Mar. 7, 2000). Optical switch 100 is formed by a silica planar optical circuit substrate 51, where a two-dimensional optical circuit is formed by providing a rectangular optical waveguide having a slightly high refractive index within silica planar optical circuit substrate 51. Generally, silica planar optical circuit substrate 51 having a refractive index of about 1.5 is employed, while optical waveguide 2 portion is made of a material with a refractive index that is higher by about 1%. The portion of optical waveguide 2 is in general also referred to as a "core." A trench 52 is formed such that it traverses a position that partially overlaps with a crosspoint of optical waveguides 2, and trench 52 is filled with refractive index-matching oil 56. Refractive index-matching oil 56 is oil having a refractive index equal to that of optical waveguide 2.

An operation of optical switch 100 will be described. In optical switch 100, a bubble generating mechanism, not shown, is provided which can generate a bubble 53 and also make bubble 53 disappear in the liquid of refractive index-matching oil 56 at a crosspoint of optical waveguides 2. For the bubble generating mechanism, the same mechanism as that used for a head of a bubble-jet printer may be employed.

When bubble 53 is generated at a crosspoint, a light that enters into the crosspoint is totally reflected by a surface of bubble 53, while when no bubble 53 exists, the light travels in a straight line because optical waveguide 2 and refractive index-matching oil 56 have an equal refractive index. By utilizing this property, an optical path can be switched between two states of reflection/straight travel by generation/disappearance of bubble 53.

In optical switch 100 formed in the above-described manner, accuracy of an etching process requires a width of trench 52 to be at least about 15 µm. In addition, there is a problem of optical loss of at least 0.07 dB per crosspoint. On the other hand, optical loss L [dB] of optical switch 100 as a whole is given by the following formula:

$$L = 2C + (m-1)T + (n-1)T + R,$$

where m is a number of input ports, n is a number of output ports,

C is a loss [in dB] upon entry of a light into an optical switch from an optical fiber and during travel through an optical waveguide to an active area which is a crosspoint, T is a loss [in dB] upon traversing one trench and during transmission through a section of a short optical waveguide between two crosspoints, and R is a loss [in dB] for reflection upon a sidewall of an empty trench and transmission through a section of a short optical waveguide between two crosspoints.

For instance, when configuring a large-scale 1000×1000 optical switch, specific numerical values substituted into the above formula give $L = 2 \times 0.25 + (1000-1) \times 0.07 + (1000-1) \times 0.07 + 2.1 = 142.46$ dB. Thus, even with an ideally produced optical switch, optical loss of 142.46 dB would occur. It is necessary to limit optical loss L to 10 dB or below in order for an optical switch to function without degrading signal quality. In this manner, there is a disadvantage in that a larger scale than about 32×32 is difficult to form with such type of configuration when optical loss is considered.

Moreover, silica planar optical circuit substrate 51 is produced by a device similar to that which produces a semiconductor so that a large optical switch would disadvantageously become extremely expensive to produce. Further, since bubble 53 is produced and utilized each time it is needed in refractive index-matching oil 56, there is a problem of optical switching malfunction occurring when the generated bubble 53 is too small or when the bubble is generated out of position. Furthermore, depending on the condition of refractive index-matching oil 56, local absorption of light would take place with a small globule of refractive index-matching oil 56 such that an optical path in its periphery would disadvantageously burn due to the energy of a signal light.

It is, therefore, an object of the present invention to provide an optical switch that facilitates production, that can be formed in large scale with little optical loss, and that does not involve switching malfunction or burning as described above.

SUMMARY OF THE INVENTION

To achieve the above object, an optical switch according to the present invention includes a plate material basically made of polymer and a drive element. The plate material has optical waveguides that extend linearly within the plate material and a cut provided such that it traverses the optical waveguides, and the drive element selects a path of light by reducing and increasing the gap of the cut.

By adopting the above-described arrangement, the distance of a gap can be switched between being as narrow as ¼ the wavelength of a signal light or narrower and being wider than ¼ the wavelength by reducing and increasing the gap of a cut so that switching between connection/reflection of the signal light can be performed. With this type, accuracy with which a gap is controlled may be low so that an optical switch can be formed in a simple manner.

According to the present invention, the cut preferably is cut in from one side of the plate material and is a path selective slit that does not reach the other side of the plate material. By adopting this arrangement, misalignment of optical waveguides can be prevented since a portion of the plate material remains connected.

According to the present invention, the optical waveguides cross one another inside the plate material, and the cut is arranged such that it transverses a crosspoint of the optical waveguides. By adopting this arrangement, switching between connection/reflection at a crosspoint can be effected so that a direction of a signal light can be selected as either of the optical paths at the crosspoint.

According to the present invention, the optical waveguides preferably cross one another inside the plate material, and the cut is arranged such that it transverses a plurality of crosspoints of the optical guides, and the path selective slit extends linearly such that it traverses a plurality of the crosspoints, and plate material has a stress release slit that crosses the path selective slit between one of the crosspoints and another of the crosspoints.

According to the present invention, the drive element preferably is a pressuring element for pressing the cut from one side, and a gap of the cut is reduced to a distance that is ¼ a wavelength of light propagating a signal or less by pressing effected by a pressuring element. By adopting this arrangement, optical waveguides can be connected by pressing effected by a pressuring element so that a signal light can be transmitted as it is.

According to the present invention, the drive element preferably is a pressuring element for pressing the cut from one side, and a gap of the cut is increased to a distance that is greater than ¼ a wavelength of light propagating a signal by pressing effected by a pressuring element. By adopting this arrangement, optical waveguides can be blocked by pressing effected by a pressuring element so that a signal light cannot be transmitted and is totally reflected. With this type, the natural form of optical waveguides with substantially no local deformation can be maintained upon transmission so that optical loss during transmission can be reduced.

According to the present invention, the plate material preferably includes a plate-like supporting member having a recessed portion on a surface opposite to the side on which exists a location pressed by the pressuring element. By adopting this arrangement, a plate material can be displaced even with a weak force. Thus, switching between connection/reflection of optical waveguides can be performed with little driving force.

According to the present invention, the pressuring element preferably is a member that can be advanced and retracted along a direction substantially perpendicular to the plate material. By adopting this arrangement, the selection of whether or not to press a plate material by advancement or retraction of a member becomes possible, which facilitates control.

According to the present invention, the pressuring element preferably is a coil formed on a surface of the plate material, a magnet provided in the vicinity of the coil, and a current supply element for supplying a current to the coil. By adopting this arrangement, electrical switching between connection/reflection at each crosspoint can be achieved with a simple mechanism.

According to the present invention, the pressuring element preferably is a balloon-like member which is disposed in contact with the plate material and which can be expanded and contracted. By adopting this arrangement, switching between connection/reflection of optical waveguides can be performed with a very small structure.

According to the present invention, the drive element preferably includes a wedge-shaped member that can be inserted into the cut, and a gap of the cut is increased to a distance that is greater than ¼ a wavelength of a light propagating a signal by inserting the wedge-shaped member into the cut. By adopting this arrangement, switching between connection/reflection of an optical switch can be effected with a smaller energy than that required in a case where a push rod or a coil is used.

According to the present invention, refractive index-matching oil is preferably applied on a surface exposed inside the cut. By adopting this arrangement, optical loss during connection of optical waveguides can be further reduced.

According to the present invention, the drive element preferably includes a bending element that can block passage of a signal light within the optical waveguides by bending one side to a larger extent than the other side, the one side and the other side having the cut located therebetween along the optical waveguides. By adopting this arrangement, one of the optical waveguides can be bent to a large extent so as to deflect it completely from the path of the other optical waveguide such that no signal light would leak into the optical waveguide that is not the one having light entering into it. Thus, loss can be reduced.

To achieve the above object, a method of producing the optical switch according to the present invention in which a plate material basically made of polymer and a drive element are provided, the plate material having optical waveguides that extend linearly within the plate material and a cut provided such that it traverses the optical waveguides, and the drive element selecting a path of light by reducing and increasing a gap of the cut, includes a slit forming step for providing a slit in the plate material by applying a cutting edge of a cutting tool against the plate material and moving the cutting edge along a direction in which a slit is to be formed while applying a pulling force in a direction perpendicular to the direction in which a slit is to be formed in a plane formed by the plate material.

By adopting the above-described method, a cross section having an orderly alignment on a molecular level can be obtained with a simple operation. As a result, the adhesion upon connection improves, and an optical switch with small optical loss during connection can be obtained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A and 3B are diagrams related to the description of a principle of switching between connection/reflection for an optical switch in another example of the first embodiment according to the present invention.

FIG. 4A is a perspective view showing a step of producing a polymer optical waveguide of the first embodiment according to the present invention, and FIG. 4B is a cross sectional view thereof.

DESCRIPTION OF THE PREFERRED EMBODIMENTS

First Embodiment

Figure 1:
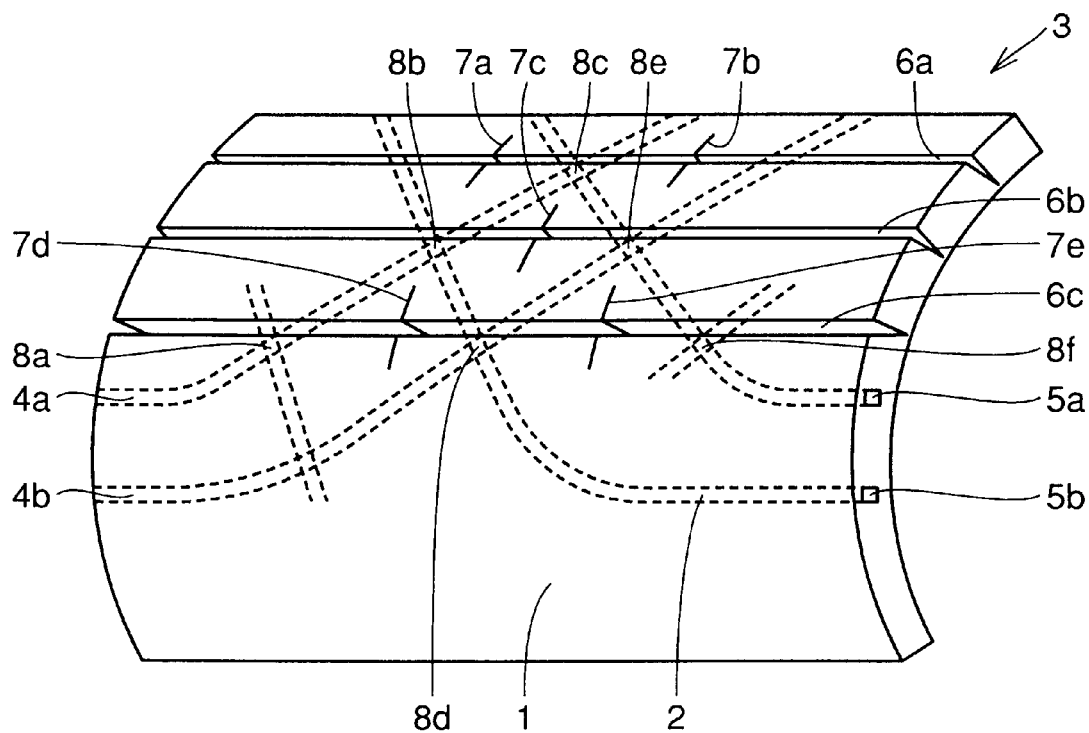
FIG. 1 is a perspective view of an optical switch according to a first embodiment of the present invention.

The optical switch of the first embodiment according to the present invention will be described with reference to FIG. 1. FIG. 1 shows a portion of a polymer optical waveguide 3 used for the optical switch. Polymer optical waveguide 3 has first to third slits 6a to 6c formed as cuts with a keen-edged cutting tool cutting into a polyimide film 1. In addition, polymer optical waveguide 3 has first to fifth stress release slits 7a to 7e provided perpendicular to first to third slits 6a to 6c. In the present specification, a "slit" refers to one that is partly cut and partly connected, while a "cut" includes a slit as well as one that is completely cut off.

For the ease of description, first and second input ports 4a, 4b and first and second output ports 5a, 5b are illustrated in polymer optical waveguide 3; however, a greater number of input ports and output ports may be present. Many optical waveguides 2 are formed inside polyimide film 1 corresponding to the respective input ports and output ports, and cross at crosspoints 8a to 8f.

Although not shown in FIG. 1, a pressuring element for pressing against the crosspoint portion from one side is provided in the vicinity of each crosspoint. For instance, a push rod 9 as those shown in FIGS. 2A and 2B may be employed as a pressuring element.

Figure 2A:
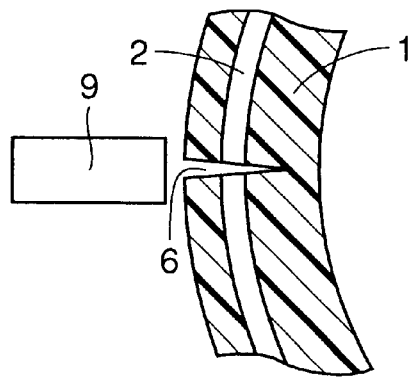
FIGS. 2A and 2B are diagrams related to the description of a principle of switching between connection/reflection for an optical switch in one example of the first embodiment according to the present invention.
Figure 2B:
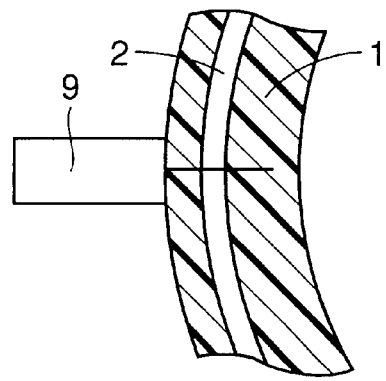

An operation of switching an optical path will be described with reference to FIGS. 2A and 2B. FIGS. 2A and 2B show enlarged a portion of crosspoints 8a to 8f of optical waveguides 2. First, in the state of FIG. 2A in which push rod 9 is not pushed against polyimide film 1, a signal light that has traveled through optical waveguide 2 is reflected at the portion of a slit 6. On the other hand, in the state of FIG. 2B in which push rod 9 is pushed against polyimide film 1, an upper optical waveguide 2 and a lower optical waveguide 2 are physically joined by the pressing effected by push rod 9 so that a signal light is transmitted, without reflection, through a portion where slit 6 existed.

Turning back to FIG. 1, the description of the operation continues. In the optical switch provided with polymer optical waveguide 3 of FIG. 1, for example, push rods 9 (see FIG. 2) are pressed against crosspoints 8a, 8b, 8e, and 8f while a crosspoint 8c alone is free. In this case, optical waveguide 2 is cut by a slit 6a at an angle of 45° at crosspoint 8c such that an optical signal is totally reflected at crosspoint 8c. As a result, a signal light that enters from a first input port 4a can be output to a first output port 5a.

In addition, in a case where push rods 9 are pushed against crosspoints 8a and 8d and a crosspoint 8b is free, a signal light that enters from first input port 4a can be output to a second output port 5b.

Similarly, by pressing push rods 9 against only the crosspoints suitably selected from crosspoints 8a to 8f, incident light from first or second input port 4a or 4b can be output to a desired one of first and second output ports 5a and 5b.

Moreover, a stress release slit 7c is formed between a crosspoint 8b and a crosspoint 8e, for instance. Consequently, when crosspoint 8b is pushed by push rod 9, a crosspoint 8e can be prevented from being distorted due to the deformation communicated to crosspoint 8e. In this manner, stress release slits may be respectively provided between crosspoints so as to allow independent control of connection/reflection at crosspoints that are close to one another.

As described above, the optical switch according to this embodiment performs switching between connection/reflection in optical waveguides by expansion and contraction of a polymer optical waveguide caused by pressing of a push rod so that more accurate switching can be effected advantageously in comparison with the conventional type in which refractive index-matching oil is used. In addition, during connection, optical waveguides themselves are physically connected so that the connection can be effected with extremely small loss.

Moreover, as shown in FIGS. 2A and 2B, misalignment of optical waveguides 2 can be prevented using a structure in which polyimide film 1 on both sides of a slit 6 that is a cut is partially connected in the location of slit 6.

In addition, slit 6 may be a slit made by a keen-edged cutting tool so that a cross section of polyimide film 1 can be made smooth being cut with the cutting tool, whereby a cut surface without scattering can be formed at a crosspoint.

Furthermore, the pressing of slit 6 by push rod 9 is effected so that a width of a gap of slit 6 can easily be made as narrow as ¼ of a signal wavelength or narrower. Thus, the accuracy with which a gap of slit 6 is controlled may be relatively low so that an optical switch can be produced at a low cost.

In addition, as shown in FIGS. 3A and 3B, a supporting member 12 may be applied to a back side of polyimide film 1 and a recess 21 may be provided in supporting member 12 at a location corresponding to slit 6 so that polyimide film 1 pressed by push rod 9 can be displaced even with a weak force. Consequently, switching between connection/reflection of optical waveguides can be performed with little driving force.

An example of a method of producing polymer optical waveguide 3 of such an optical switch is given below.

As shown in FIG. 4A, polyimide film 1 is superposed on and adhered to a rubber sheet 10 in advance, and a keen-edged cutting tool, for example, a blade of a dicer or other cutting machines is brought into contact with polyimide film 1 while pulling forces 11a and 11b are collinearly applied. As a result, polyimide film 1 is rapidly cut by splitting due to cleavage, and rubber sheet 10 is stretched until it attains the natural state of elastic deformation corresponding to pulling forces 11a and 11b. At this time, cutting of polyimide film 1 can be guided along a desired straight line by moving the cutting tool in a direction of an arrow 20 according to the speed at which cleavage progresses. FIG. 4B shows a cross section of this state. It is sufficient that slit 6 is formed with a depth that just reaches optical waveguide 2 inside polyimide film 1; there is no need to cut into rubber sheet 10.

In this manner, a cross section having an orderly alignment on a molecular level can be obtained by applying the cutting tool against a surface of polyimide film 1 while a pulling force is continuously applied.

Second Embodiment

Figure 5A:
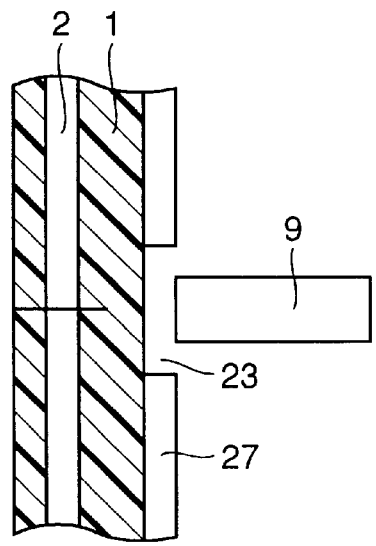
FIGS. 5A and 5B are diagrams related to the description of a principle of switching between connection/reflection for an optical switch in one example of a second embodiment according to the present invention.
Figure 5B:
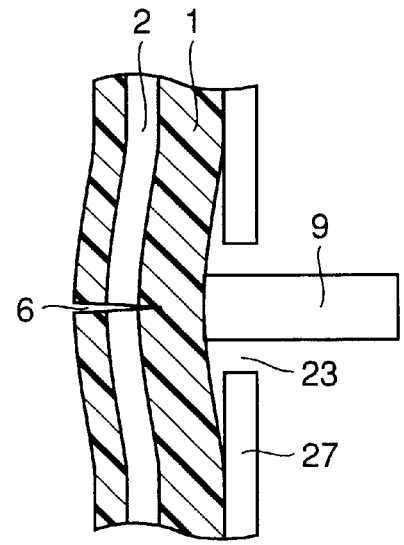

An optical switch of the second embodiment according to the present invention will be described with reference to FIGS. 5 to 8. As shown in FIGS. 5A and 5B, push rod 9 is to push through a through hole 23 of a holding plate 27 onto a surface opposite to the back side of polyimide film 1, i.e. a side having slit 6. As shown in FIG. 5A, without push rod 9 pushing, slit 6 is closed up and optical waveguides 2 are in a connected state. On the other hand, as shown in FIG. 5B, when push rod 9 pushes, optical waveguides 2 are bent, and a width of a gap of slit 6 is spread wider than ¼ the signal wavelength. Consequently, a signal light propagated inside optical waveguide 2 would be totally reflected.

Figure 6:
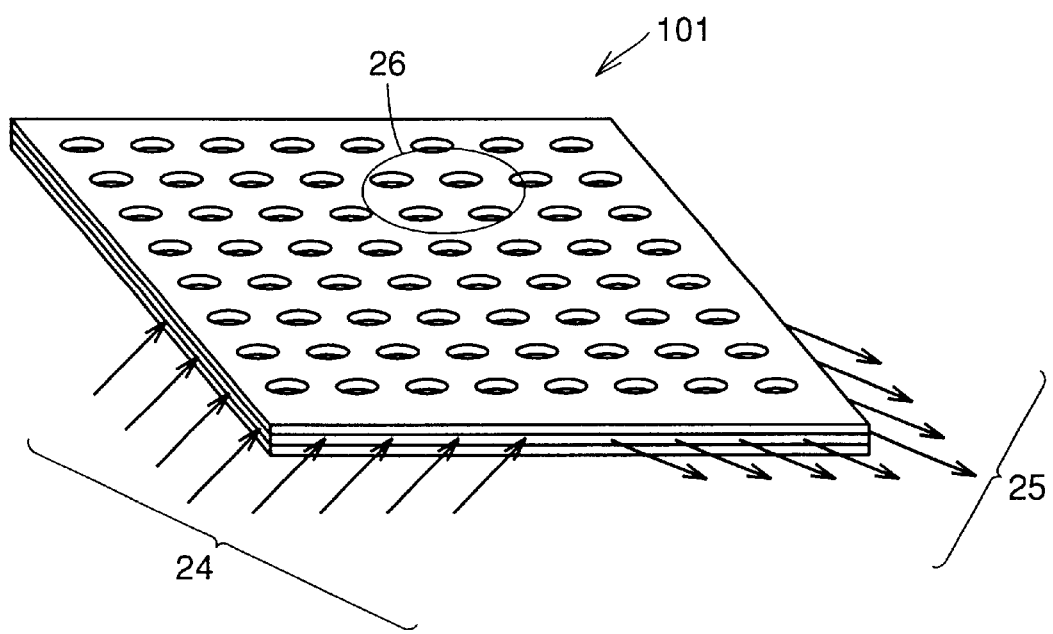
FIG. 6 is a perspective view showing an optical switch of the second embodiment according to the present invention.
Figure 7:
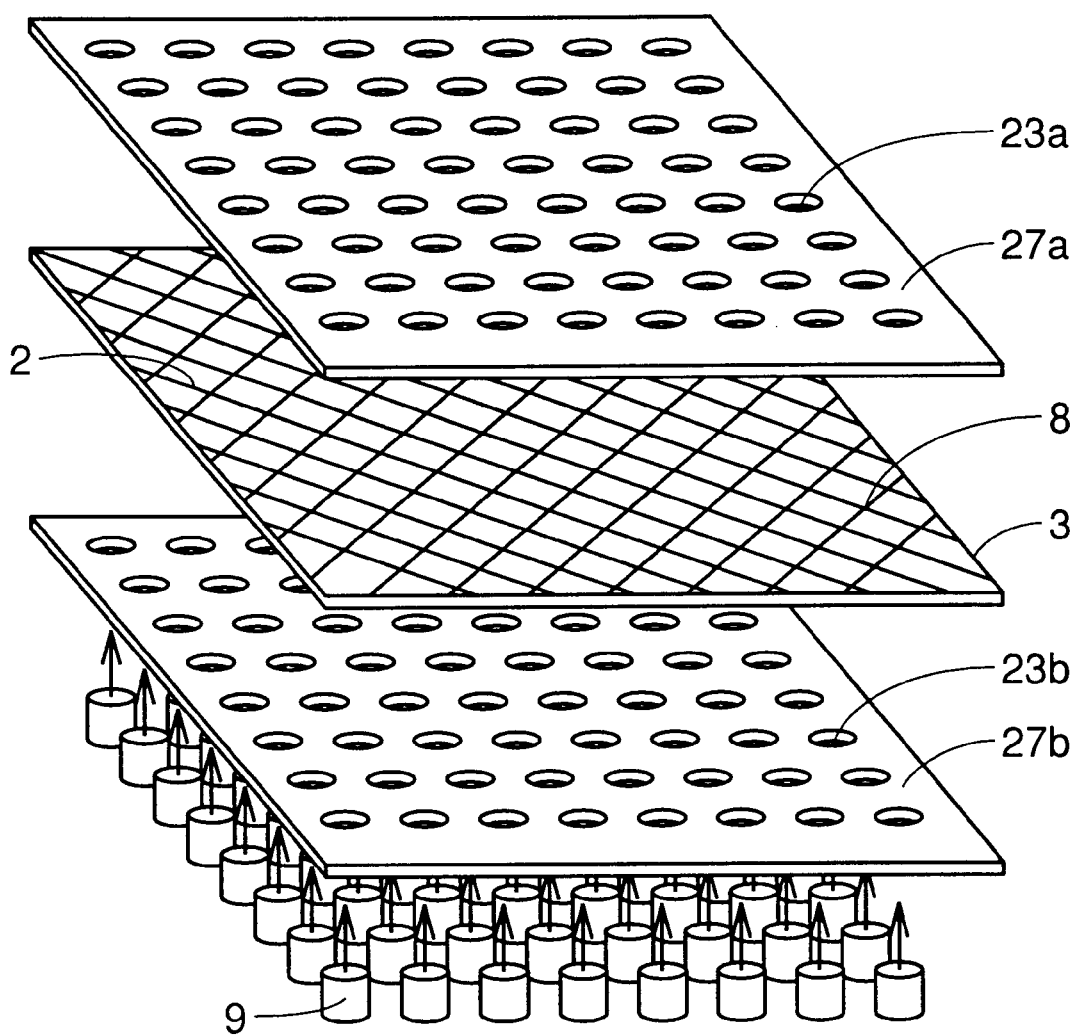
FIG. 7 is an exploded view showing the optical switch of the second embodiment according to the present invention.

FIG. 6 shows an example in which a plurality of such structures are put together into a larger scale. This forms an optical switch 101 having eight ports respectively for input and output. An exploded view of optical switch 101 is shown in FIG. 7. Optical switch 101 has eight input ports and eight output ports, and has a structure in which holding plates 27a, 27b sandwich from above and below polymer optical waveguide 3 to which are provided optical waveguides 2 that connect the respective input ports and output ports and that cross one another, slit 6, and a stress release slit (not shown). Through holes 23a, 23b are provided in holding plates 27a, 27b in positions corresponding to the respective crosspoints 8 in polymer optical waveguide 3. Push rods 9 are respectively disposed in positions corresponding to the respective through holes 23a and 23b. Push rods 9 are capable of pushing up the respective crosspoint 8 portions in polymer optical waveguide 3 via through holes 23a, 23b from beneath holding plate 27b with a drive element, not shown.

Figure 8:
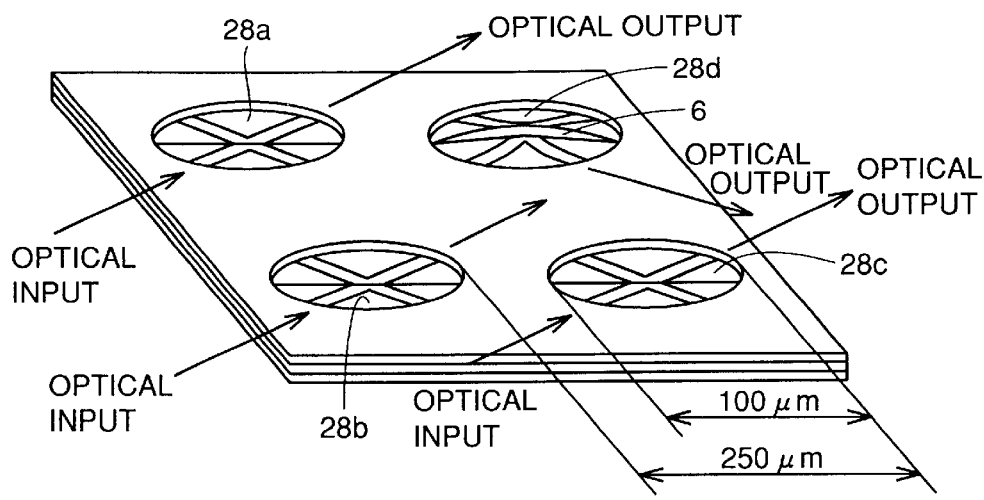
FIG. 8 is an enlarged view taking out one portion of FIG. 6.

FIG. 8 shows an enlarged view of a portion 26 of optical switch 101 in FIG. 6. Here, ports 28a to 28d are shown, and push rod 9 pushes up polymer optical waveguide 3 at port 28d alone among these four ports. Thus, the signal light travel straight in ports 28a, 28b, and 28c, whereas the signal light is totally reflected at port 28d since slit 6 is pushed open and spread.

While the state of local deformation due to pushing by push rod 9 becomes the connected state of optical waveguides 2 in the first embodiment, the natural state where push rod 9 is not pushing is the connected state of optical waveguides 2 in this second embodiment so that a signal light is propagated with substantially no local deformation of optical waveguides 2. Thus, a transmission loss upon passing of a signal light through slit 6 in the connected state can be further reduced when compared with the first embodiment. With transmission loss in each slit 6 reduced, the total loss among a plurality of input and output ports of the optical switch as a whole can also be reduced.

In addition, a polymer optical waveguide can be held in a planar condition so that an optical switch can be easily formed, for instance, by sandwiching the polymer optical waveguide with flat plates provided with prescribed through holes as described above.

Third Embodiment

Figure 9A:
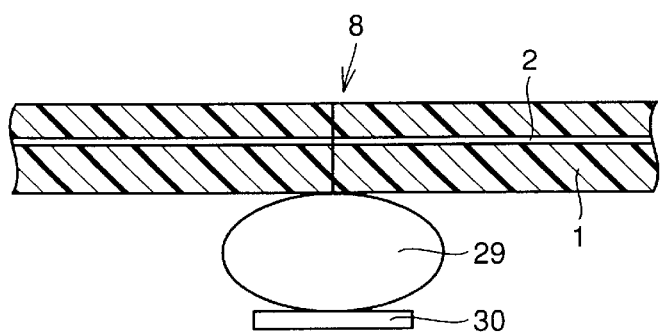
FIGS. 9A and 9B are diagrams related to the description of a principle of switching between connection/reflection for an optical switch of a third embodiment according to the present invention.
Figure 9B:
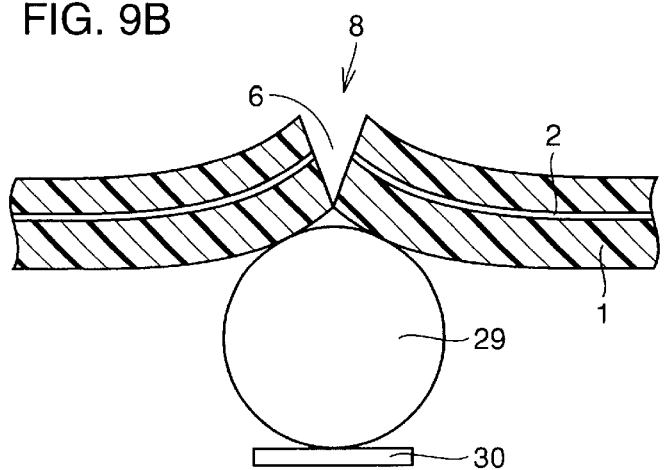

The cross sectional views of the vicinity of a crosspoint in polymer optical waveguide 3 of the optical switch in the third embodiment according to the present invention are shown in FIGS. 9A and 9B. The third embodiment is basically the same as the second embodiment, except that a balloon 29 filled with liquid and a piezo element 30 in contact with balloon 29 are provided in place of push rod 9 as a pressuring element for pushing up a portion near a crosspoint. The arrangement in other portions is the same as that shown in the second embodiment.

In the initial state, that is, with optical waveguides 2 in the connected state, balloon 29 is somewhat flat. By sending ultrasonic waves from piezo element 30, a pressure within balloon 29 is increased, and balloon 29 becomes spherical. Then, balloon 29 pushes up the portion near a crosspoint in polymer optical waveguide 3, and slit 6 opens. A width of the gap of slit 6 becomes wider than ¼ the signal wavelength so that a signal light is totally reflected. Connection/reflection of optical waveguides can be switched using such a change.

Fourth Embodiment

Figure 10A:
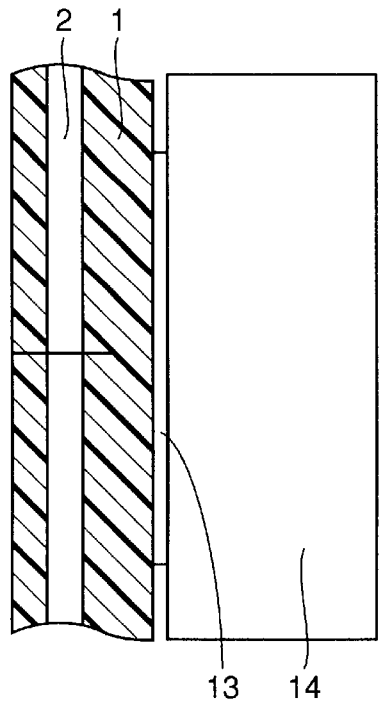
FIGS. 10A and 10B are diagrams related to the description of a principle of switching between connection/reflection for an optical switch of a fourth embodiment according to the present invention.
Figure 10B:
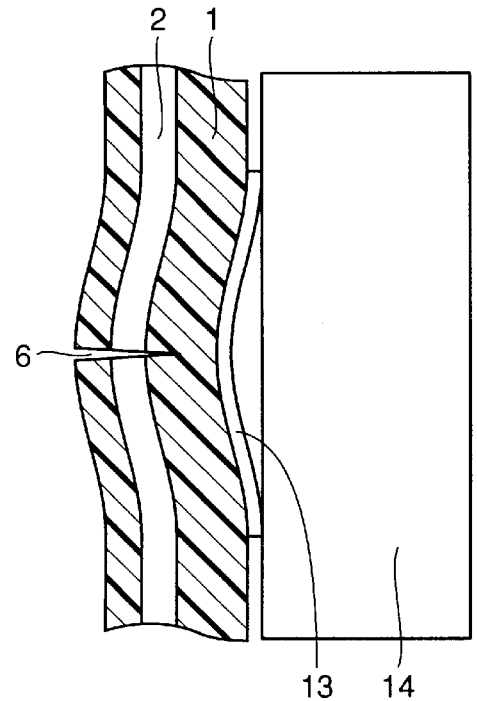

The cross sectional views of the vicinity of a crosspoint in polymer optical waveguide 3 of the optical switch in the fourth embodiment according to the present invention are shown in FIGS. 10A and 10B. The fourth embodiment is basically the same as the second embodiment, except that a coil 13 and a magnet 14 are provided in place of push rod 9 as a pressuring element for pushing up a portion near a crosspoint. Coil 13 is spiral within a plane. Magnet 14 is a permanent magnet, for instance. The arrangement in other portions is the same as that shown in the second embodiment.

By supplying a current to coil 13, a repulsive force operates between coil 13 and magnet 14. This repulsive force deforms coil 13 so that coil 13 can push and bend polyimide film 1. As a result, the gap of slit 6 opens wider than ¼ the wavelength of a signal light so that the signal light is totally reflected. Thus, according to this embodiment, electrical switching between connection/reflection at each crosspoint can be achieved with a simple mechanism.

Fifth Embodiment

Figure 11A:
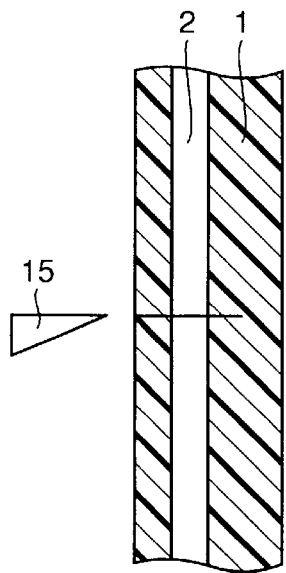
FIGS. 11A and 11B are diagrams related to the description of a principle of switching between connection/reflection for an optical switch of a fifth embodiment according to the present invention.
Figure 11B:
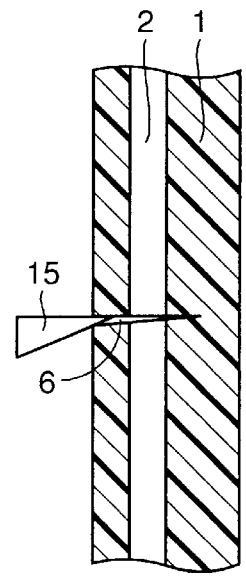

The cross sectional views of the vicinity of a crosspoint in polymer optical waveguide 3 of the optical switch in the fifth embodiment according to the present invention are shown in FIGS. 11A and 11B. The fifth embodiment is basically the same as the second embodiment, except that a wedge-shaped member 15 is provided in place of a pressuring element as an element for spreading a gap of slit 6 at a crosspoint. The arrangement in other portions is the same as that shown in the second embodiment.

By inserting wedge-shaped member 15 into slit 6, the width of the gap can be spread wider than ¼ the wavelength of a signal light. Consequently, the signal light is totally reflected. In this case, switching between connection/reflection of the optical switch can be effected with smaller energy than that required by push rod 9 or coil 13.

Sixth Embodiment

Figure 12:
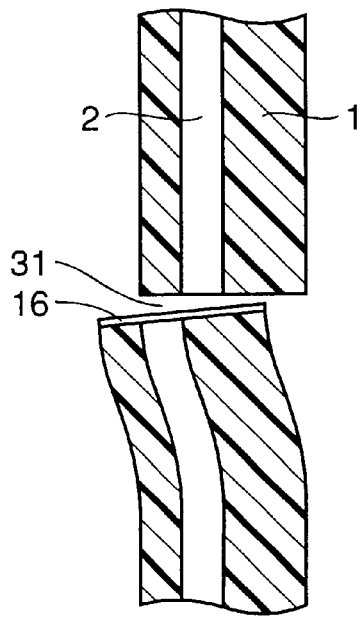
FIG. 12 is a diagram related to the description of a principle of switching between connection/reflection for an optical switch of a sixth embodiment according to the present invention.
Figure 13:
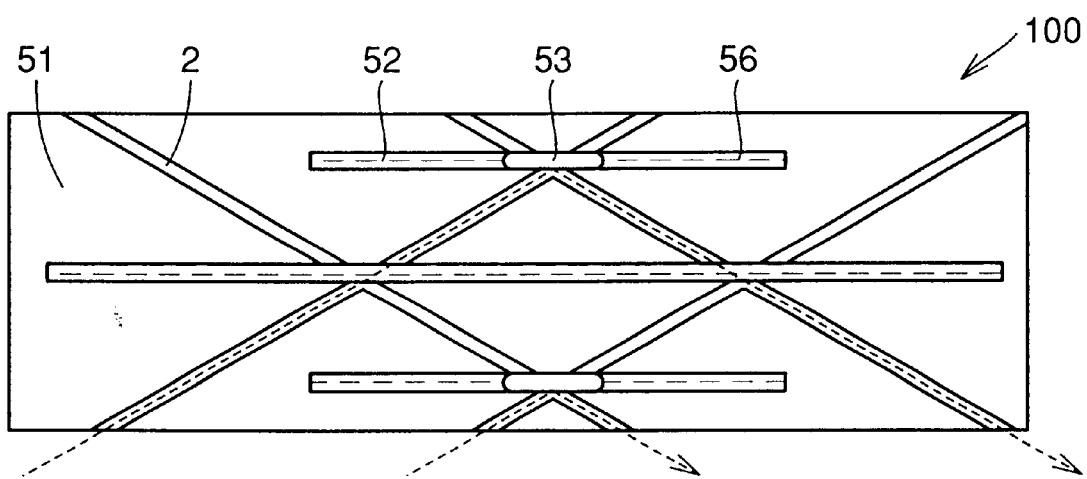
FIG. 13 is a cross sectional view of a conventional optical switch.

A cross sectional view of the vicinity of a crosspoint in polymer optical waveguide 3 of the optical switch in the sixth embodiment according to the present invention is shown in FIG. 12. The sixth embodiment is basically the same as the second embodiment, except that what corresponds to slit 6 in the earlier embodiments is not slit 6 of a shape that is partly connected, but is a cut 31 having a shape that is completely cut off. Refractive index-matching oil 16 is thinly applied on a cut surface exposed in the gap.

Instead of pushing and spreading the gap with a pressuring element, a bending element (not shown) is provided for bending at least one of an upper optical waveguide 2 and a lower optical waveguide 2 in the diagram by bending polyimide film 1 itself such that the upper optical waveguide and the lower optical waveguide would have different curvatures. The arrangement in other portions is the same as that shown in the second embodiment.

At least one of the upper optical waveguide 2 and the lower optical waveguide 2 can be bent by bending polyimide film 1 itself. In the example shown in FIG. 12, the upper part remains unbent, while the lower part is bent. In this manner, a signal light can no longer be transmitted through and is totally reflected. When neither of the upper part and the lower part are bent, the upper part and the lower part are approximate or in contact with one another such that a gap of cut 31 is as narrow as ¼ the wavelength of a signal light or narrower so that the signal light can be transmitted. Connection/reflection of optical waveguides can be switched using such a change.

Moreover, assuming that a signal light is propagated from the upper side to the lower side in FIG. 12, the lower optical waveguide 2 may be bent to a large extent so as to deflect it completely from the path of the upper optical waveguide 2. Thus, no signal light would leak into the lower part, and loss can be reduced.

In addition, since refractive index-matching oil is applied to a cut surface so that optical loss during connection of optical waveguides 2 can be further reduced.

According to the present invention, by reducing and increasing a gap of a cut of a plate material such as a polyimide film, the distance of the gap can be switched between being as narrow as ¼ the wavelength of a signal light or narrower and being wider than ¼ the wavelength so that switching between connection/reflection of the signal light can be performed. With this type, accuracy with which a simple gap is controlled may be low so that an optical switch can be formed in a simple manner. In addition, optical loss is small, a large-scale formation can be easily adopted, and switching malfunction and burning can be eliminated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical switch, comprising:
   a plate material basically made of polymer; and
   drive means, wherein
      said plate material includes optical waveguides that extend linearly within said plate material and a cut provided such that it traverses said optical waveguides, said drive means selecting a path of light by reducing and increasing a gap of said cut.

2. The optical switch according to claim 1, wherein
   said cut is cut in from one side of said plate material and is a path selective slit that does not reach other side of said plate material.

3. The optical switch according to claim 2, wherein said optical waveguides cross one another inside said plate material, and said cut is arranged such that it transverses a plurality of crosspoints of said optical guides, and said path selective slit extends linearly such that it traverses a plurality of said crosspoints, and plate material has a stress release slit that crosses said path selective slit between one of said crosspoints and another of said crosspoints.

4. The optical switch according to claim 1, wherein
   said optical waveguides cross one another inside said plate material, and said cut is arranged such that it transverses a crosspoint of said optical waveguides.

5. The optical switch according to claim 1, wherein
   said drive means is pressuring means for pressing said cut from one side, and a gap of said cut is reduced to a distance that is ¼ a wavelength of light propagating a signal or less by pressing effected by said pressuring means.

6. The optical switch according to claim 5, wherein
   said plate material includes a plate-like supporting member having a recessed portion on a surface opposite to a side on which exists a location pressed by said pressuring means.

7. The optical switch according to claim 5, wherein
   said pressuring means is a member that can be advanced and retracted along a direction substantially perpendicular to said plate material.

8. The optical switch according to claim 5, wherein
   said pressuring means is a coil formed on a surface of said plate material, a magnet provided in a vicinity of said coil, and current supply means for supplying a current to said coil.

9. The optical switch according to claim 5, wherein
   said pressuring means is a balloon-like member which is disposed in contact with said plate material and which can be expanded and contracted.

10. The optical switch according to claim 1, wherein
    said drive means is pressuring means for pressing said cut from one side, and a gap of said cut is increased to a distance that is greater than ¼ a wavelength of a light propagating a signal by pressing effected by pressuring means.

11. The optical switch according to claim 1, wherein
    said drive means includes a wedge-shaped member that can be inserted into said cut, and a gap of said cut is increased to a distance that is greater than ¼ a wavelength of a light propagating a signal by inserting said wedge-shaped member into said cut.

12. The optical switch according to claim 1, wherein
    refractive index-matching oil is applied on a surface exposed inside said cut.

13. The optical switch according to claim 1, wherein
    said drive means includes bending means that can block passage of a signal light within said optical waveguides by bending one side to a larger extent than other side, the one side and the other side having said cut located therebetween along said optical waveguides.

14. A method of producing an optical switch in which a plate material basically made of polymer and drive means are provided, said plate material having optical waveguides that extend linearly within said plate material and a cut provided such that it traverses said optical waveguides, and said drive means selecting a path of light by reducing and increasing a gap of said cut, comprising:
    a slit forming step for providing a slit in said plate material by applying a cutting edge of a cutting tool against said plate material and moving the cutting edge along a direction in which a slit is to be formed while applying a pulling force in a direction perpendicular to the direction in which a slit is to be formed in a plane formed by said plate material.

* * * * *